United States Patent [19]

Klein

[11] 4,278,453
[45] Jul. 14, 1981

[54] GAS PURIFICATION

[75] Inventor: Jordan N. Klein, Summerfield, Fla.

[73] Assignee: Mako Compressors Inc., Ocala, Fla.

[21] Appl. No.: 124,307

[22] Filed: Feb. 25, 1980

[51] Int. Cl.³ .............................................. B01D 46/00
[52] U.S. Cl. ........................................ 55/275; 55/387;
  55/502; 55/505; 55/316; 252/408; 285/345
[58] Field of Search .......... 55/275, 274, 316, 387–389,
  55/502, 505, DIG. 33, DIG. 34; 252/408;
  210/443, 440, 460, 282, DIG. 17, DIG. 13,
  DIG. 6; 422/119, 120; 128/202.26, 205.27,
  202.22; 285/345

[56] References Cited

U.S. PATENT DOCUMENTS

| | | | |
|---|---|---|---|
| 1,684,587 | 9/1928 | Hultman | 252/408 |
| 1,873,592 | 8/1932 | James | 285/345 |
| 2,620,893 | 12/1952 | Holt et al. | 285/345 |
| 2,961,303 | 11/1960 | Wisweisser | 422/119 |
| 3,029,581 | 4/1962 | Robbins | 55/389 |
| 3,175,342 | 3/1965 | Balogh | 55/389 |
| 3,216,802 | 11/1965 | Smith | 252/408 |
| 3,239,064 | 3/1966 | White | 210/440 |
| 3,705,480 | 12/1972 | Wireman | 55/272 |
| 3,941,573 | 3/1976 | Chapel | 55/389 |

Primary Examiner—Bernard Nozick

[57] ABSTRACT

A gas purification system featuring in one aspect an improved arrangement for indicating carbon monoxide and moisture content, and in another aspect an improved arrangement for mounting a replaceable cartridge in a housing.

10 Claims, 2 Drawing Figures

GAS PURIFICATION

BACKGROUND OF THE INVENTION

This invention relates to gas purification, using purifier cartridges.

Purifiers are typically used in compressed air systems to produce a breathable stream. The cartridge is replaceable, and is mounted in a permanent housing for operation. An effective seal must be provided between the housing and the cartridge, typically at an end cap, to permit gas exchange between the housing exterior and the cartridge interior. The housing has a removable end plug to permit replacement of the cartridge.

To monitor carbon monoxide and moisture content of the air stream, color change indicator wafers have been supported in a housing separate from the main purifier housing, with a window for viewing the wafers. Air tight flow connections must be provided between the two housings.

SUMMARY OF THE INVENTION

In one aspect the invention features improved indicator mounting. An indicator plug is mounted in the purifier housing adjacent a cartridge end cap having a restricted gas exchange opening therethrough; the plug has at least a portion spaced from and communicating with the end cap to define a gas flow zone communicating with the exchange opening; and the plug houses the indicator and the window, and has a gas flow space communicating between the indicator and the flow zone. In preferred embodiments the plug is screwed in the end of a cylindrical purifier housing with its flat end facing the end cap, and the flow space consists of a bore in the plug at that end and relief in a carrier for the indicator.

In another aspect the invention features a gland mounted in an end cap opening, and a tube mounted in a gas exchange passage of the purifier housing, the gland having a bore to receive the tube in sealed relation to the cartridge. In preferred embodiments the gland is sealed to the tube by an internal o-ring, and the opening in the second end cap of the cartridge is too small to receive the tube. Sealing is thus highly effective, because of the tube/gland geometry and the provision of a fresh o-ring with each new cartridge. Insertion of the new cartridge is easy and foolproof.

Other features and advantages of the invention will appear from the following description of the preferred embodiment.

DESCRIPTION OF THE PREFERRED EMBODIMENT

We first briefly describe the drawings.

Drawings

Structure

Figure 1:
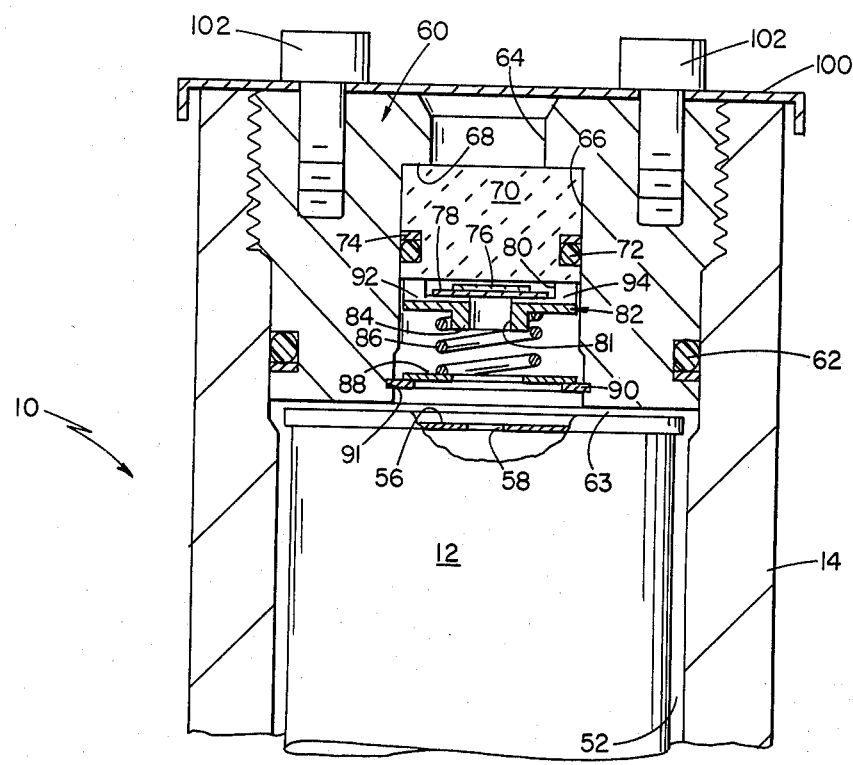
FIG. 1 is a sectional view, broken away, of a purifier embodying the invention.
Figure 1:
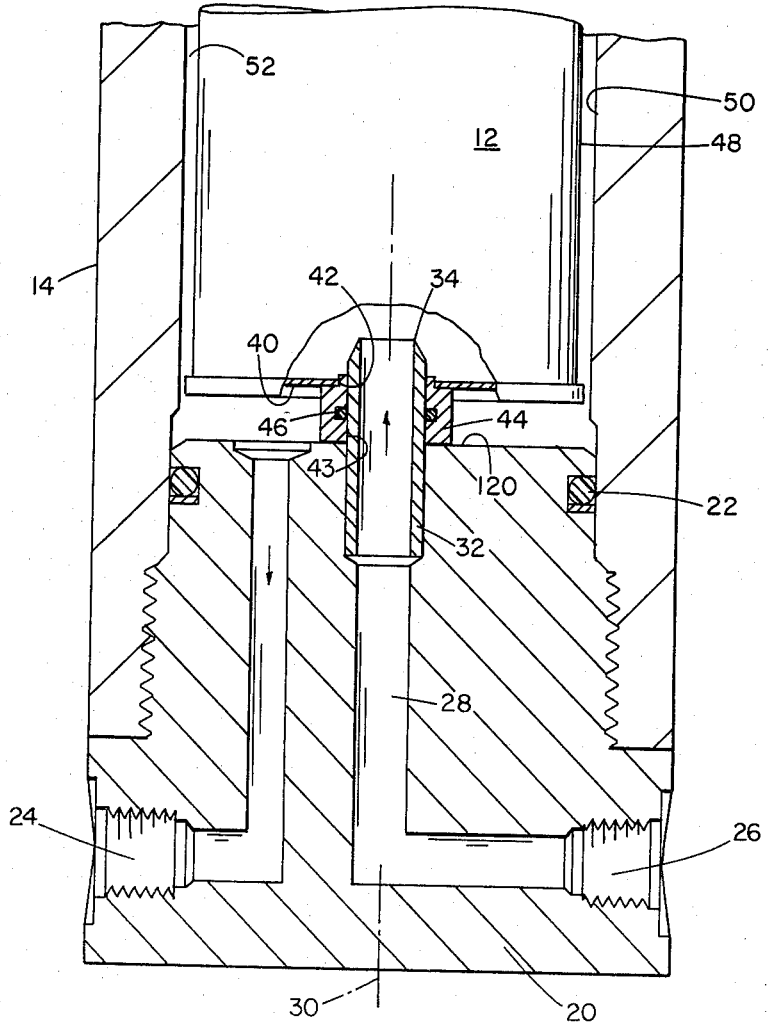
Figure 2:
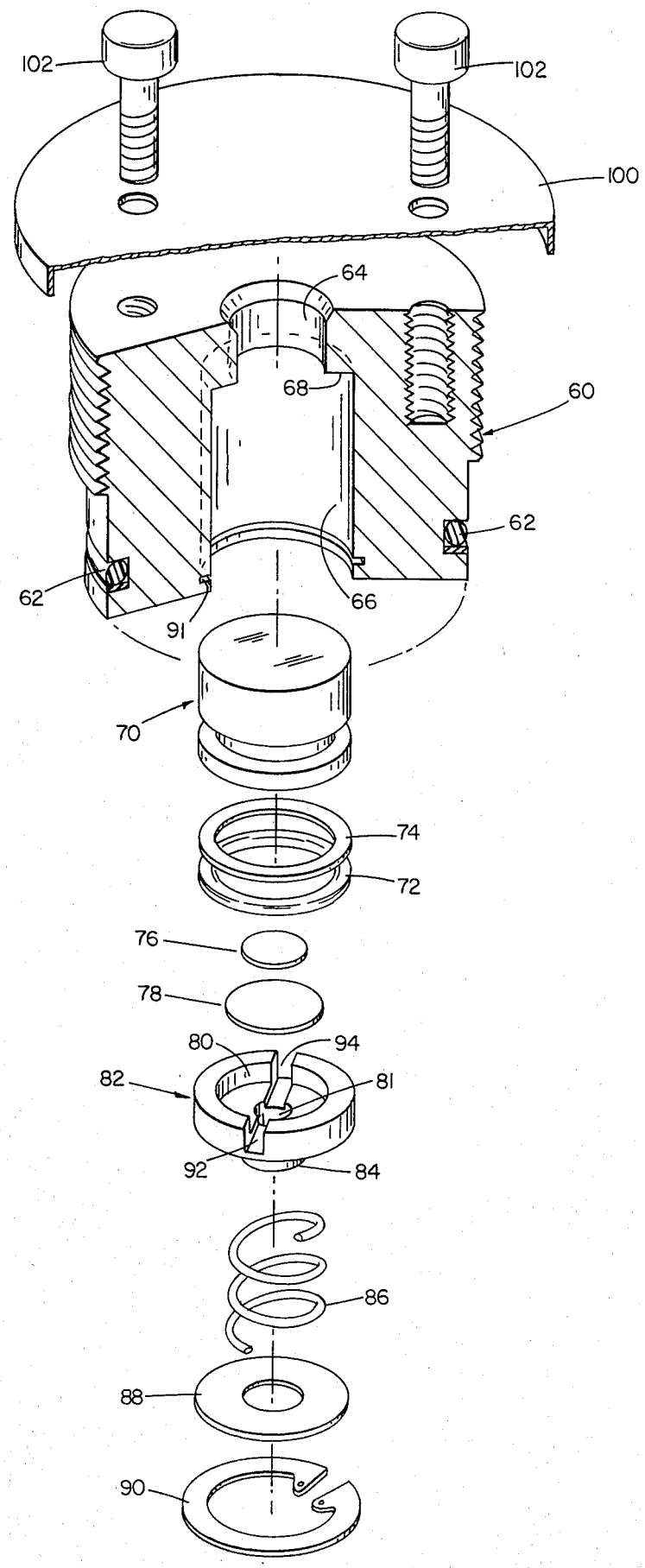
FIG. 2 is an enlarged, exploded view of the indicator plug assembly shown in FIG. 1.

Air purifier 10 has cylindrical treatment cartridge 12 mounted in a cylindrical housing 14.

Plug 20, screwed in one end of the housing and sealed thereto by o-ring 22, has L-shaped inlet and outlet air passages 24 and 26. Inlet passage 26 has a leg 28 extending along central axis 30 of the purifier, and is counterbored at its inner end to receive one end of stainless steel tube 32, chamfered at its protruding end 34.

Cartridge 12 contains conventional chemicals for removing contaminants and moisture from a compressed air stream. End cap 40 has a central air inlet opening 42 in which is swaged brass or aluminum gland 44. The gland has a central bore 43 to snugly receive tube 32, and has an internal o-ring 46 to seal tightly against the tube. Imperforate outer wall 48 of the cartridge is spaced from inner wall 50 of housing 14 to provide a return air flow zone 52. The opposite end cap 56 of the cartridge has a central air outlet slot 58, narrower than the diameter of tube 32. A plastic plug and a paper sticker (neither shown) respectively seal openings 43 and 58 prior to installation of the cartridge in housing 14.

Plug 60 is screwed in other end of housing 14 and sealed thereto by o-ring 62. Plug 60 is spaced from cartridge end cap 56 to permit air flow in zone 63 therebetween. Plug 60 is axially bored at 64 and counterbored at 66 to provide shoulder 68 against which fits transparent window block 70, sealed to the cylindrical wall of counterbore 66 by o-ring 72 and backup ring 74. Conventional color-changing carbon monoxide and dewpoint indicator wafers 76 (e.g., sold by Harvey-Westbury Corp. of Westbury, New York, as its Model RB 301 Carbon Monoxide Detector Button) and 78 (e.g., silica gel impregnated paper with humidity indicating color, sold by Humidial Corporation of Colton, California as its Humi-Gel Dehydrator Paper) fit in counterbore 80 of carrier 82; wafer 78 is of larger diameter than wafer 76 so that its periphery (as well as the whole of wafer 76) can be seen through block 70. Coil spring 86 surrounds carrier post 84 and bears against washer 88 to press the carrier against block 70; washer 88 in turn bears against o-ring 90 in groove 91. Axial bore 81 through post 84, and grooves 92, 94, are provided in carrier 82 (the outside diameter of which is smaller than the diameter of counterbore 66), all to allow air flow access to wafers 76 and 78.

Cover 100 is held on the indicator end of purifier 10 by screws 102, which extend into plug 60.

Operation

A new cartridge 12 is installed in housing 14 by unscrewing plug 60, removing the plastic plug and sticker from the cartridge end caps, and pressing the cartridge into housing 14 to force gland 44 over tube 32 and against stop surface 120 of plug 20. The size of slot 58 makes upside-down installation impossible. Because of the geometry provided, and the fact that each gland has its own fresh o-ring, sealing will be excellent. Plug 60 is then replaced.

Air flow through cartridge and housing is conventional. At the indicator end, turbulence will cause air to flow through washer 88, spring 86, bore 81, and grooves 92, 94 to contact wafers 76 and 78, causing them to change color in accordance with the amounts of carbon monoxide and moisture in the air. The wafers may be viewed by simply removing one screw 102 and loosening the other, and rotating cover 100 to expose window 70.

Other embodiments are within the following claims.

I claim:

1. In gas purification apparatus having a purification cartridge mounted in a housing having an inlet and an outlet, said cartridge containing chemicals for removing contaminants and moisture from gas, the interior of said cartridge communicating with said housing inlet, said cartridge having at least one end wall with a restricted opening therethrough to permit gas flow from the interior to the exterior of said cartridge, that improvement comprising a removable indicator plug mounted in said housing adjacent to said cartridge and having at least a portion spaced from and facing said restricted opening in said end wall thereby defining a gas flow zone communicating with said opening, said flow zone also communicating with said housing outlet, said indicator plug having a replaceable visual indicator for at least one expected pollutant of said gas mounted in said plug, wherein turbulent gas flow from said restricted opening in said cartridge reaches said indicator in said plug and a window mounted in said plug to permit observation of said indicator from outside said housing, said plug having gas flow space communicating between said indicator and said zone.

2. The improvement of claim 1 wherein said housing is cylindrical and said plug is removably sealed in an end thereof.

3. The improvement of claim 2 wherein said portion is a flat end of said plug through which there is an axial bore into said plug to define said flow space.

4. The improvement of claim 3 wherein said indicator is held against said window by a carrier in said bore, and said carrier is relieved to further provide said flow space.

5. The improvement of claim 1 wherein said improvement further comprises a second plug in said housing adjacent a second end wall of said cartridge, said second plug having a gas flow passage from said housing inlet to a tube mounted in said passage and extending inwardly of said housing from said second plug, said cartridge having a second end cap with gas exchange opening therethrough and a gland mounted in said opening, said gland having a bore to receive said tube in a sealed relationship to said cartridge.

6. In gas purification apparatus having a purification cartridge mounted in a housing having an inlet and an outlet, said cartridge containing chemicals for removing contaminants and moisture from gas, the interior of said cartridge communicating with said housing inlet, said cartridge having at least one end wall with a restricted opening therethrough to permit gas flow from the interior to the exterior of said cartridge, that improvement comprising a gland mounted in said opening, and a tube mounted in a passage of said housing for exchange of gas between the exterior and interior of said housing, said gland having a bore to receive said tube in a sealed relation to said cartridge so that the flow passageway from the housing inlet through said passage and said tube and into said cartridge is unrestricted, said gland also having an internal O-ring to seal against the external surface of said tube.

7. The improvement of claim 6 wherein said housing and said cartridge have coincident central axes and said gland bore and said tube extend along said axes.

8. The improvement of claim 6 wherein said gland is swaged to an end cap.

9. The improvement of claim 6 wherein said cartridge has a second end cap with a gas exchange opening therethrough, said opening of said second cap being too small to admit said tube.

10. The improvement of claim 6 wherein said passage is an end plug of said housing, and a surface of said plug surrounding said passage provides a stop for said gland.

4,278,453.—*Jordan N. Klein*, Summerfield, Fla. GAS PURIFICATION. Patent dated July 14, 1981. Disclaimer filed June 7, 1984, by the assignee, *Mako Compressors, Inc.*

Hereby enters this disclaimer to claims 5–10 of said patent.
[*Official Gazette August 21, 1984.*]